(12) United States Patent
Tanabe et al.

(10) Patent No.: US 9,097,188 B2
(45) Date of Patent: Aug. 4, 2015

(54) GAS TURBINE DEVICE

(75) Inventors: Hiroshi Tanabe, Hyogo (JP); Noboru Hisaka, Hyogo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 860 days.

(21) Appl. No.: 12/999,374

(22) PCT Filed: Oct. 1, 2008

(86) PCT No.: PCT/JP2008/067825
§ 371 (c)(1),
(2), (4) Date: Feb. 4, 2011

(87) PCT Pub. No.: WO2010/038290
PCT Pub. Date: Apr. 8, 2010

(65) Prior Publication Data
US 2011/0167783 A1 Jul. 14, 2011

(51) Int. Cl.
F02C 9/40 (2006.01)
F02C 7/22 (2006.01)
F02C 3/20 (2006.01)
F02C 3/22 (2006.01)
(Continued)

(52) U.S. Cl.
CPC ... F02C 9/40 (2013.01); F02C 3/20 (2013.01); F02C 3/22 (2013.01); F02C 3/28 (2013.01); F02C 3/30 (2013.01); F02C 7/22 (2013.01); F02C 7/236 (2013.01); Y02E 20/16 (2013.01)

(58) Field of Classification Search
CPC ............. F02C 3/20; F02C 3/30; F02C 7/22; F02C 3/34; Y02E 20/16; F23R 3/286; F23R 3/14; F23R 3/28
USPC ......... 60/39.461, 39.463, 39.465, 39.52, 737, 60/734, 780, 39.281, 39.464; 431/5, 12
See application file for complete search history.

(56) References Cited

U.S. PATENT DOCUMENTS 4,761,948 A  8/1988 Sood et al.
4,936,089 A * 6/1990 Komiyama et al. .......... 60/39.12
(Continued)

FOREIGN PATENT DOCUMENTS

CN   101023255 A   8/2007
DE   102006008712 A1   9/2006
(Continued)

OTHER PUBLICATIONS

ISR for PCT/JP2008/067825 mailed Nov. 25, 2008.
(Continued)

*Primary Examiner* — Phutthiwat Wongwian
*Assistant Examiner* — Steven Sutherland
(74) *Attorney, Agent, or Firm* — Kanesaka, Berner & Partners

(57) ABSTRACT

The disclosure provides a gas turbine device capable of producing a mixed gas in which three or more types of gases are evenly mixed, and of doing the like. To achieve this, in a gas turbine device configured to burn in a combustor a fuel gas supplied from a fuel gas supplier, together with a compressed air supplied from an air compressor, and to rotationally drive a gas turbine by a combustion gas generated at the burning, the fuel gas supplier includes two mixers, and is configured to produce a mixed gas by mixing three types of gases of a first gas, a second gas, and a third gas in the mixers in ascending order of specific gravity or in descending order of specific gravity, and to supply the mixed gas to the combustor as the fuel gas.

13 Claims, 4 Drawing Sheets

(51) Int. Cl.
  *F02C 3/28* (2006.01)
  *F02C 3/30* (2006.01)
  *F02C 7/236* (2006.01)

(56) References Cited

U.S. PATENT DOCUMENTS

| | | | |
|---|---|---|---|
| 6,389,796 | B1 * | 5/2002 | Mandai et al. ............. 60/39.182 |
| 6,397,575 | B2 * | 6/2002 | Tomlinson et al. ............. 60/783 |
| 7,007,487 | B2 * | 3/2006 | Belokon et al. ................. 60/777 |
| 7,396,228 | B2 | 7/2008 | Tanabe et al. |
| 2005/0242781 | A1 | 11/2005 | Nakagawa |
| 2006/0234171 | A1 * | 10/2006 | Tanabe et al. ..................... 431/2 |
| 2006/0248894 | A1 * | 11/2006 | Hiramoto et al. ............... 60/772 |
| 2007/0003897 | A1 * | 1/2007 | Koizumi et al. ............... 431/354 |
| 2008/0115502 | A1 * | 5/2008 | Roby et al. ...................... 60/783 |

FOREIGN PATENT DOCUMENTS

| | | | |
|---|---|---|---|
| EP | 1953365 | A2 | 8/2008 |
| EP | 1953365 | A3 | 8/2011 |
| JP | 01-286260 | A | 11/1989 |
| JP | 03-030668 | U | 6/1991 |
| JP | 05-125958 | A | 5/1993 |
| JP | 5138308 | A | 6/1993 |
| JP | 2954456 | B2 | 9/1999 |
| JP | 2003254090 | A | 9/2003 |
| JP | 2004027975 | A | 1/2004 |
| JP | 2004332057 | A | 11/2004 |
| JP | 2006-077698 | A | 3/2006 |
| JP | 2006299869 | A | 11/2006 |
| JP | 2007-113541 | A | 5/2007 |
| JP | 2007291905 | A | 11/2007 |
| WO | 2006087803 | A1 | 8/2006 |

OTHER PUBLICATIONS

Office Action issued on Sep. 18, 2012, by the Japanese Patent Office in corresponding Application No. JP-2011-233484, with English translation.
Notice of Allowance issued on Oct. 2, 2012, by the Japanese Patent Office in corresponding Application No. JP-2011-233485, with English translation.
Office Action which issued in corresponding Chinese Patent Application No. 200880130054.2 (Chinese Language Version).
Office Action which issued in corresponding Chinese Patent Application No. 200880130054.2 (English Language Version).
JP Office Action for 2007-208808 dated Aug. 30, 2011.
Extended European Search Report issued Oct. 2, 2014, corresponding to European patent application No. 08877149.8.

* cited by examiner

GAS TURBINE DEVICE

RELATED APPLICATIONS

The present application is based on, and claims priority from, International Application Number PCT/JP2008/067825, filed Oct. 1, 2008.

TECHNICAL FIELD

The present invention relates to a gas turbine device which uses a mixed gas obtained by mixing together three or more types of gases as a fuel gas for a combustor.

BACKGROUND ART

A gas turbine device dedicated to low calorie gas combustion which is capable of using multiple types of low calorie gases with different calories at the same time is generally known as an example of a gas turbine device which uses a mixed gas obtained by mixing together three or more types of gases as a fuel gas for a combustor. The gas turbine device dedicated to low calorie gas combustion is used, for example, in a steel mill. In the steel mill, various excessive gases such as a blast furnace gas (B gas), a coke oven gas (C gas), and a converter gas (L gas) are produced in a manufacturing process of a steel product. These excessive gases contain combustible components. For this reason, the excessive gases are used as a fuel gas for the gas turbine device in the steel mill and the like, and thereby the excessive gases are effectively used.

There are large variations in amount of byproduct gases produced. For this reason, when used as the fuel for the gas turbine device, any of the excessive gases is not used singly, but a mixed gas obtained by mixing multiple types of gases is used. Moreover, calorie adjustment may be performed by further mixing a natural gas (LNG) and the like into the mixed gas.

For example, a gas turbine device disclosed in Patent Document 1 listed below is given as a specific example of the gas turbine device which uses the mixed gas of multiple types of excessive gases and the natural gas as the fuel gas for a combustor. In the gas turbine device disclosed in Patent Document 1, as shown in FIG. 4, the blast furnace gas, the coke oven gas, and the natural gas are mixed by a mixer 51, and this mixed gas is supplied to a combustor of a gas turbine 52 as the fuel gas.

In addition to Patent Document 1, Patent Document 2 is also given as a prior art document related to the present invention. Patent Document 2 discloses an example of a gas turbine device which reuses part of a combustion gas exhausted from a gas turbine by supplying the part of the combustion gas to an air compressor.

Patent Document 1: Japanese Patent Application Publication No. 2004-27975
Patent Document 2: Japanese Patent No. 2954456

DISCLOSURE OF THE INVENTION

Problems to be Solved by the Invention

When multiple types of gases are mixed and used as the fuel gas for a gas turbine device, if these multiple types of gases are not evenly mixed, the calorie of the mixed gas may be uneven and uneven combustion is likely to occur. Accordingly, when the multiple types of gases are mixed and used as the fuel gas for a gas turbine device, the multiple types of gases have to be mixed as evenly as possible. However, there is no particular measure related to the even mixing in the conventional gas turbine device disclosed in Patent Document 1.

Furthermore, even if a mixed gas is produced in which multiple types of gases are evenly mixed, there is a possibility that hydrogen and oxygen in the mixed gas are released thereafter and hydrogen collection and oxygen collection are generated. When the hydrogen collection and the oxygen collection are generated, the risk of an explosion increases. Particularly, in a gas turbine device which supplies the mixed gas to a combustor after compressing the mixed gas with a gas compressor, the hydrogen collection and the oxygen collection are compressed also, and thus, the possibility of an explosion further increases.

In view of the above circumstances, an object of the present invention is to provide a gas turbine device capable of producing a mixed gas in which three or more types of gases (for example, three or more types of gases from any of single gases such as a butane gas and a propane gas and gases in which multiple types of gases are mixed such as a blast furnace gas and a converter gas) are evenly mixed and also of preventing an explosion by monitoring a hydrogen concentration and an oxygen concentration in the mixed gas.

Means for Solving the Problems

A gas turbine device of a first invention for solving the above problem provides a gas turbine device configured to burn in a combustor a fuel gas supplied from a fuel gas supplier, together with a compressed air supplied from an air compressor, and to rotationally drive a gas turbine by a combustion gas generated at the burning, the gas turbine device characterized in that
the fuel gas supplier includes a plurality of mixers, and is configured to produce a mixed gas by mixing three or more types of gases in the mixers in ascending order of specific gravity or in descending order of specific gravity, and to supply the mixed gas to the combustor as the fuel gas.

A gas turbine device of a second invention provides the gas turbine device of the first invention characterized in that the fuel gas supplier is configured to include:
a hydrogen/oxygen sensor that detects a hydrogen concentration and an oxygen concentration in the mixed gas;
a diluent gas mixer that mixes, into the mixed gas, a diluent gas for diluting the hydrogen concentration and the oxygen concentration; and
a controller that causes the diluent gas mixer to operate to mix the diluent gas into the mixed gas when the hydrogen concentration and the oxygen concentration detected by the hydrogen/oxygen sensor become equal to or more than a set value.

A gas turbine device of a third invention provides the gas turbine device of the second invention characterized in that the diluent gas mixer is configured to mix, into the mixed gas, part of the combustion gas exhausted from the gas turbine as the diluent gas.

A gas turbine device of a fourth invention provides the gas turbine device of the first invention characterized in that the fuel gas supplier is configured to include a remixer that performs remixing by agitating the mixed gas.

A gas turbine device of a fifth invention provides the gas turbine device of the fourth invention characterized in that the fuel gas supplier is configured to include:
a hydrogen/oxygen sensor that detects a hydrogen concentration and an oxygen concentration in the mixed gas; and
a controller that causes the remixer to operate to remix the mixed gas when the hydrogen concentration and the oxygen concentration detected by the hydrogen/oxygen sensor become equal to or more than a set value.

A gas turbine device of a sixth invention provides the gas turbine device of the first invention characterized in that the fuel gas supplier is configured to include:
a hydrogen/oxygen sensor that detects a hydrogen concentration and an oxygen concentration in the mixed gas;
an emergency discharge valve; and
a controller that causes the emergency discharge valve to operate to discharge the mixed gas when the hydrogen concentration and the oxygen concentration detected by the hydrogen/oxygen sensor become equal to or more than a set value.

A gas turbine device of a seventh invention provides the gas turbine device of any one of the second, fifth and sixth inventions characterized in that the fuel gas supplier is configured to perform any of the mixing of the diluent gas by the diluent gas mixer, the remixing of the mixed gas by the remixer, and the discharge of the mixed gas by the emergency discharge valve at a position downstream of the hydrogen/oxygen sensor.

A gas turbine device of an eighth invention provides the gas turbine device of any one of the second to seventh inventions characterized by further comprising a gas compressor that compresses the mixed gas and supplies the mixed gas thus compressed to the combustor, the gas turbine device characterized in that
the fuel gas supplier is configured to perform any of the mixing of the diluent gas by the diluent gas mixer, the remixing of the mixed gas by the remixer, and the discharge of the mixed gas by the emergency discharge valve at a position upstream of the gas compressor.

Effect of the Invention

The gas turbine device of the first invention provides a gas turbine device configured to burn in a combustor a fuel gas supplied from a fuel gas supplier, together with a compressed air supplied from an air compressor, and to rotationally drive a gas turbine by a combustion gas generated at the burning, the gas turbine device characterized in that the fuel gas supplier includes a plurality of mixers, and is configured to produce a mixed gas by mixing three or more types of gases in the mixers in ascending order of specific gravity or in descending order of specific gravity, and to supply the mixed gas to the combustor as the fuel gas. Accordingly, gases with similar specific gravities are mixed sequentially in both cases of mixing in ascending order of specific gravity and of mixing in descending order of specific gravity. This allows production of the mixed gas in which three or more types of gases are evenly mixed. When this evenly mixed gas is used as the fuel gas for the combustor, occurrence of uneven combustion is prevented and stable combustion is made possible.

The gas turbine device of the second invention provides the gas turbine device of the first invention characterized in that the fuel gas supplier is configured to include: a hydrogen/oxygen sensor that detects a hydrogen concentration and an oxygen concentration in the mixed gas; a diluent gas mixer that mixes, into the mixed gas, a diluent gas for diluting the hydrogen concentration and the oxygen concentration; and a controller that causes the diluent gas mixer to operate to mix the diluent gas into the mixed gas when the hydrogen concentration and the oxygen concentration detected by the hydrogen/oxygen sensor become equal to or more than a set value. Accordingly, even when hydrogen and oxygen in the mixed gas are released and hydrogen collection and oxygen collection are generated, it is possible to detect that the hydrogen concentration and the oxygen concentration in the mixed gas are equal to or more than the set value, and to dilute and reduce the hydrogen concentration and the oxygen concentration of the mixed gas with the diluent gas before the mixed gas with the high hydrogen concentration and oxygen concentration is supplied to the combustor. Thus, the hydrogen concentration and the oxygen concentration in the mixed gas are suppressed to concentrations equal to or lower than the explosion limit, and the gas turbine device can be operated safely.

The gas turbine device of the third invention provides the gas turbine device of the second invention characterized in that the diluent gas mixer is configured to mix, into the mixed gas, part of the combustion gas exhausted from the gas turbine as the diluent gas. Accordingly, the combustion gas is effectively used as the diluent gas, and there is no need for a nitrogen gas or the like. Thus, an efficient and inexpensive gas turbine device can be achieved.

The gas turbine device of the fourth invention provides the gas turbine device of the first invention characterized in that the fuel gas supplier is configured to include a remixer that performs remixing by agitating the mixed gas. Accordingly, even when hydrogen and oxygen in the mixed gas are released and hydrogen collection and oxygen collection are generated (gravity separation occurs), it is possible to achieve an evenly mixed state again by performing remixing by agitating the mixed gas with the remixer before the mixed gas is supplied to the combustor. Thus, the risk of an explosion is reduced, and the gas turbine device can be operated safely.

The gas turbine device of the fifth invention provides the gas turbine device of the fourth invention characterized in that the fuel gas supplier is configured to include: a hydrogen/oxygen sensor that detects a hydrogen concentration and an oxygen concentration in the mixed gas; and a controller that causes the remixer to operate to remix the mixed gas when the hydrogen concentration and the oxygen concentration detected by the hydrogen/oxygen sensor become equal to or more than a set value. Accordingly, even when hydrogen and oxygen in the mixed gas are released and hydrogen collection and oxygen collection are generated (gravity separation occurs), it is possible to detect that the hydrogen concentration and the oxygen concentration in the mixed gas are equal to or more than the set value before the mixed gas with the high hydrogen concentration and oxygen concentration is supplied to the combustor, and to achieve an evenly mixed state again by performing remixing by agitating the mixed gas with the remixer before the mixed gas is supplied to the combustor. Thus, the risk of an explosion is reduced, and the gas turbine device can be operated safely.

The gas turbine device of the sixth invention provides the gas turbine device of the first invention characterized in that the fuel gas supplier is configured to include: a hydrogen/oxygen sensor that detects a hydrogen concentration and an oxygen concentration in the mixed gas; an emergency discharge valve; and a controller that causes the emergency discharge valve to operate to discharge the mixed gas when the hydrogen concentration and the oxygen concentration detected by the hydrogen/oxygen sensor become equal to or more than a set value. Accordingly, even when hydrogen and oxygen in the mixed gas a are released and hydrogen collection and oxygen collection are generated thereby causing an increase in the hydrogen concentration and the oxygen concentration of the mixed gas, it is possible to detect that the hydrogen concentration and the oxygen concentration in the mixed gas are equal to or more than the set value, and to discharge the mixed gas before the mixed gas is supplied to the combustor. Thus, the risk of an explosion is reduced, and the gas turbine device can be operated safely.

The gas turbine device of the seventh invention provides the gas turbine device of anyone of the second, fifth and sixth inventions characterized in that the fuel gas supplier is configured to perform any of the mixing of the diluent gas by the diluent gas mixer, the remixing of the mixed gas by the remixer, and the discharge of the mixed gas by the emergency discharge valve at a position downstream of the hydrogen/oxygen sensor. Accordingly, the mixed gas with high hydrogen concentration and oxygen concentration which is detected by the hydrogen/oxygen sensor on an upstream side can be surely mixed with the diluent gas by the diluent gas mixer, remixed by the remixer, or discharged by the emergency discharge valve on a downstream side.

The gas turbine device of the eighth invention provides the gas turbine device of any one of the second to seventh inventions characterized by further comprising a gas compressor that compresses the mixed gas and supplies the mixed gas thus compressed to the combustor, the gas turbine device characterized in that the fuel gas supplier is configured to perform any of the mixing of the diluent gas by the diluent gas mixer, the remixing of the mixed gas by the remixer, and the discharge of the mixed gas by the emergency discharge valve at a position upstream of the gas compressor. Accordingly, the mixed gas with high hydrogen concentration and oxygen concentration is mixed with the diluent gas by the diluent gas mixer, remixed by the remixer, or discharged by the emergency discharge valve before flowing into the gas compressor. Thus, the risk of an explosion can be surly reduced also in the gas turbine device with the gas compressor.

Figure 1:
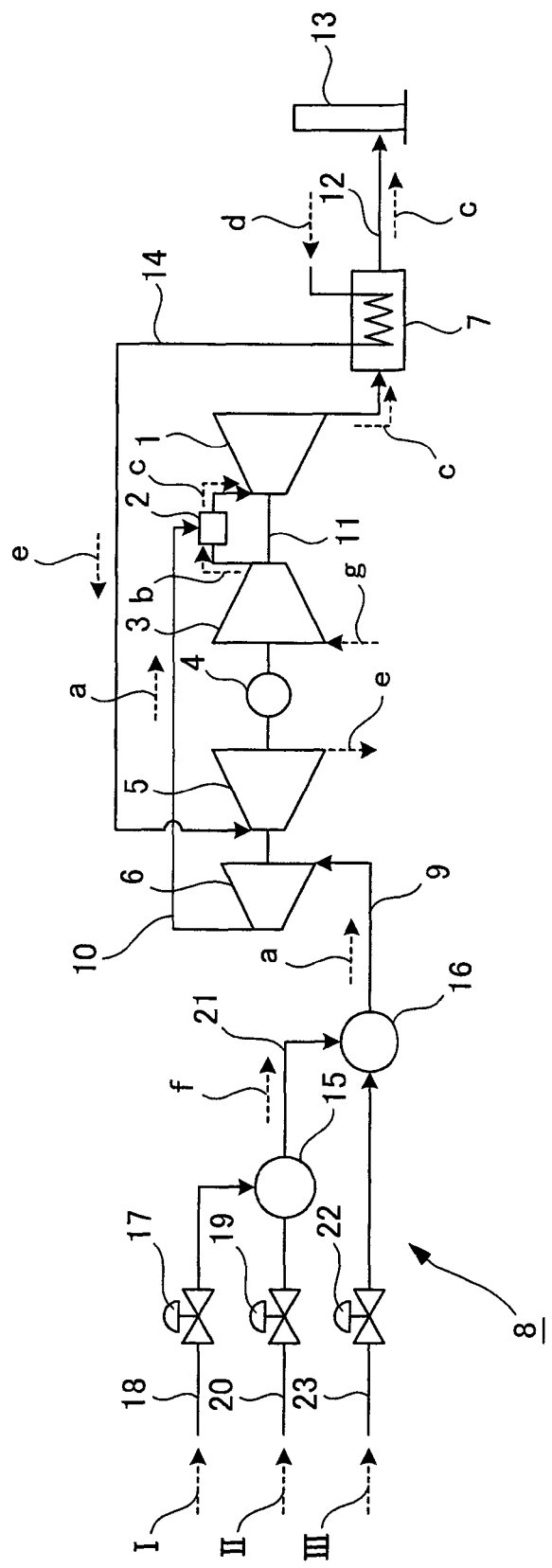
FIG. 1 is a configuration diagram of a gas turbine device according to Embodiment 1 of the present invention.

EXPLANATION OF REFERENCE NUMERALS 1 gas turbine, 2 combustor, 3 air compressor, 4 electrical generator, 5 steam turbine, 6 gas compressor, 7 exhaust heat recovery boiler, 8 fuel gas supplier, 9, 10 fuel supply line, 11 rotary shaft, 12 exhaust line, 13 stack, 14 steam line, 15 first mixer, 16 second mixer, 17 flow regulating valve, 18 fuel supply line, 19 flow regulating valve, 20, 21 fuel supply line, flow regulating valve, 23 fuel supply line, 31 hydrogen/oxygen sensor, 32 emergency discharge valve, 33 controller, 34 diluent gas mixer, 35 diluent gas supply line, fan, 37 gas cooler, 38 flow regulating valve, 39 hydrogen/oxygen sensor, 41 remixer, 42 controller, I first gas, II second gas, III third gas, a mixed gas (fuel gas), b compressed air, c fuel gas, exhaust gas, d feed water, e steam, f mixed gas, g outside air (air)

BEST MODES FOR CARRYING OUT THE INVENTION

Embodiments of the present invention will be described below in detail on the bases of the drawings.
<Embodiment 1>

FIG. 1 is a configuration diagram of a gas turbine device according to Embodiment 1 of the present invention. As shown in FIG. 1, the gas turbine device of Embodiment 1 is a combined cycle power generating device which generates electric power by causing a gas turbine and a steam turbine to operate. The gas turbine device includes a gas turbine 1, a steam turbine 5, a combustor 2, an air compressor 3, an electrical generator 4, a gas compressor 6, an exhaust heat recovery boiler 7, and a fuel gas supplier 8.

A mixed gas a produced in the fuel gas supplier 8 flows into the gas compressor 6 through a fuel supply line 9, and is compressed there. Thereafter, the compressed mixed gas a is supplied to the combustor 2 through a fuel supply line 10 as a fuel gas. In the combustor 2, the fuel gas (mixed gas a) supplied from the fuel gas supplier 8 is burned together with a compressed air b supplied from the air compressor 3. A combustion gas c produced at the burning is supplied to the gas turbine 1 to rotationally drive the gas turbine 1.

The combustion gas (exhaust gas) c exhausted from the gas turbine 1 flows through an exhaust line (flue) 12. Then, heat is recovered from the combustion gas c via the heat exchange with a feed water d in the exhaust heat recovery boiler 7 provided to the exhaust line 12. Thereafter, the combustion gas c is dissipated from a stack 13. Meanwhile, the feed water d is heated due to the heat exchange with the combustion gas (exhaust gas) c, and turns into a steam e in the exhaust heat recovery boiler 7. This steam e is supplied to the steam turbine 5 through a steam line 14, and thus the steam turbine 5 is rotationally driven. The steam e exhausted from the steam turbine 5 is condensed in an unillustrated condenser, and is reused as the feed water d.

The gas turbine 1, the steam turbine 5, the air compressor 3, the electrical generator 4, and the gas compressor 6 are disposed on the same rotary shaft 11. The air compressor 3, the electrical generator 4, and the gas compressor 6 are rotationally driven by the gas turbine 1 and the steam turbine 5. Accordingly, the air compressor 3 takes in and compresses an outside air (air) g, and supplies this compressed air b to the combustor 2 as described above. The electrical generator 4 generates electric power, and transmits this generated electric power to unillustrated power systems inside a steel mill and outside the steel mill. The gas compressor 6 takes in and compresses the mixed gas a, and supplies this compressed mixed gas a to the combustor 2 as described above.

The fuel gas supplier 8, which is a characteristic feature of Embodiment 1, includes two mixers 15, 16. By use of these mixers 15, 16, three types of gases of a first gas I, a second gas II, and a third gas III are mixed in ascending order of specific gravity or in descending order of specific gravity, and thus the mixed gas a is produced. Then, the fuel gas supplier 8 supplies this mixed gas a to the combustor 2 through the gas compressor 6 as described above.

In detail, an inlet side of the first mixer 15 is connected to a downstream end of a fuel supply line 18 provided with a flow regulating valve 17 and also to a downstream end of a fuel supply line 20 provided with a flow regulating valve 19. On the other hand, an outlet side of the first mixer 15 is connected to an upstream end of a fuel supply line 21. Meanwhile, an inlet side of the second mixer 16 is connected to a downstream end of the fuel supply line 21 and also to a downstream end of a fuel supply line 23 provided with a flow regulating valve 22. On the other hand, an outlet side of the second mixer 16 is connected to an upstream end of the fuel supply line 9.

Accordingly, in the fuel gas supplier 8, the first gas I and the second gas II are firstly mixed in the first mixer 15, and a mixed gas f is produced, the first gas I supplied through the fuel supply line 18 while having its flow regulated by the flow regulating valve 17, the second gas II supplied through the fuel supply line 20 while having its flow regulated by the flow regulating valve 19. Next, the third gas III and the mixed gas f are mixed in the second mixer 16, and the mixed gas a is produced, the third gas III supplied through the fuel supply line 23 while having its flow regulated by the flow regulating valve 22, the mixed gas f supplied through the fuel supply line 21.

Moreover, the first gas I, the second gas II, and the third gas III are selected in away that their relationships in terms of specific gravity satisfies the first gas I<the second gas II<the third gas III, or the first gas I>the second gas II>the third gas III. Thus, the first gas I, the second gas II, and the third gas III are mixed in ascending order of specific gravity, or in descending order of specific gravity. Table I shows specific gravities of various gases. Assume that, among these gases, a blast furnace gas, a coke oven gas, which are excessive gases generated in a steel mill, and a natural gas (LNG) are used, for example. In a case of mixing in descending order of specific gravity, the first gas I is the blast furnace gas, the second gas II is the natural gas, and the third gas III is the coke oven gas. In a case of mixing in ascending order of specific gravity, the first gas I is the coke oven gas, the second gas II is the natural gas, and the third gas III is the blast furnace gas.

from any of single gases such as a butane gas and a propane gas and gases in which multiple types of gases are mixed such as a blast furnace gas and a converter gas), and may also be applied to a case of mixing three or more types of gases (for example, three or more types of gases from any of single gases such as a butane gas and a propane gas and gases in which multiple types of gases are mixed such as a blast furnace gas and a converter gas).

<Embodiment 2>

Figure 2:
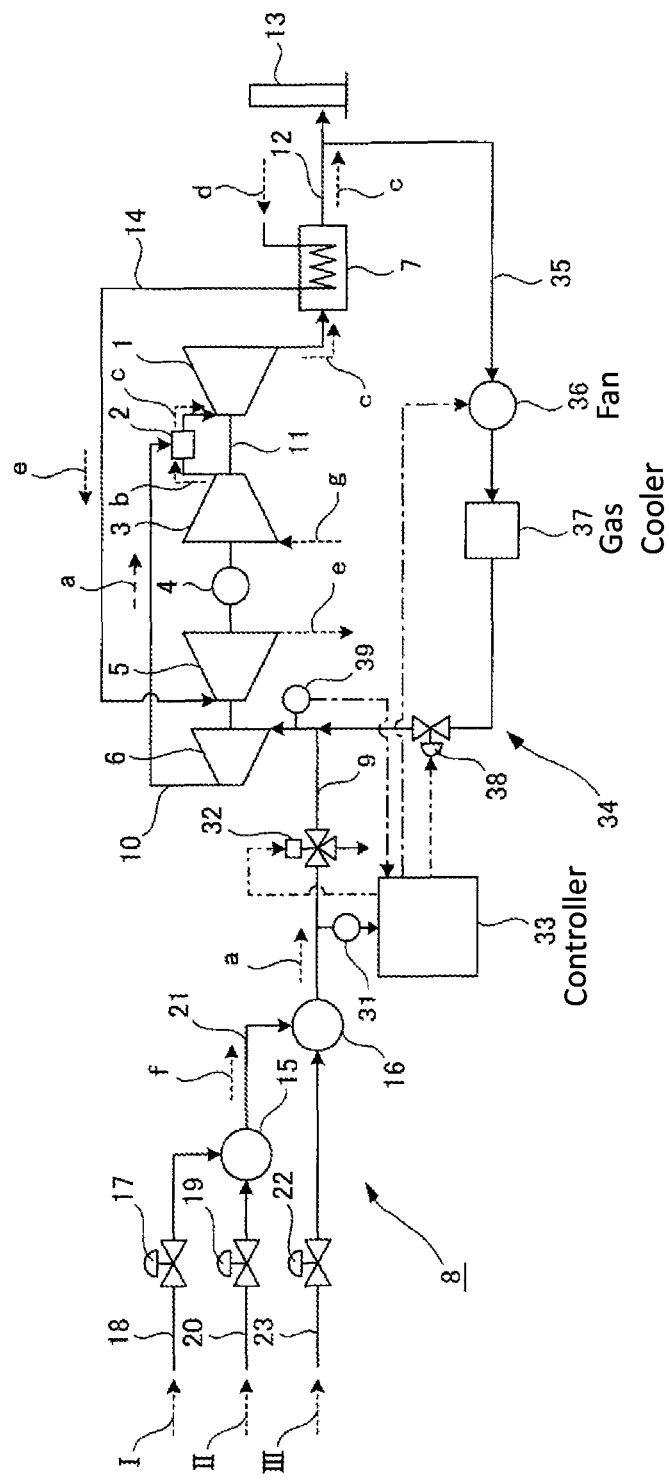
FIG. 2 is a configuration diagram of a gas turbine device according to Embodiment 2 of the present invention.

FIG. 2 is a configuration diagram of a gas turbine device according to Embodiment 2 of the present invention. Note that, in FIG. 2, components which are the same as those in FIG. 1 (Embodiment 1) are denoted with the same reference numerals as in FIG. 1, and overlapping detailed description thereof will be omitted.

As shown in FIG. 2, a fuel gas supplier 8 of Embodiment 2 includes hydrogen/oxygen sensors 31, 39, an emergency discharge valve 32, a controller 33, and a diluent gas mixer 34 in addition to the same configuration as that of the fuel gas supplier 8 of Embodiment 1 (FIG. 1).

The hydrogen/oxygen sensor 31 is provided to the fuel supply line 9 at a position downstream of the second mixer 16, and detects the hydrogen concentration and the oxygen concentration in the mixed gas a. The emergency discharge valve 32 is a three-way valve provided to the fuel supply line 9 at a

TABLE 1

COMPOSITION EXAMPLES

| | Vol % | | | | | | | | |
|---|---|---|---|---|---|---|---|---|---|
| | CO | $CO_2$ | $H_2$ | $N_2$ | Methane $CH_4$ | Ethane $C_2H_6$ | Propane $C_3H_8$ | Butane $C_4H_{10}$ | Calorie $Kcal/Nm^3$ | Specific Gravity |
| Butane gas | — | — | — | — | — | — | — | 100 | 31000 | 1.98 |
| Propane gas | — | — | — | — | — | — | 100 | — | 24000 | 1.54 |
| Converter gas | 66.5 | 16.0 | 0.9 | 16.6 | — | — | — | — | 2030 | 1.05 |
| Blast furnace gas | 21.6 | 23.9 | 2.6 | 51.9 | — | — | — | — | 719 | 1.01 |
| Natural gas | — | — | — | — | 91.8 | 4.0 | 2.7 | 1.5 | 13100 | 0.65 |
| Coke oven gas | 7.0 | 2.0 | 58 | 1 | 32 | — | — | — | 5041 | 0.35 |

According to the gas turbine device of Embodiment 1, in the gas turbine device configured to burn in the combustor 2 the fuel gas supplied from the fuel gas supplier 8 together with the compressed air b supplied from the air compressor 3, and to rotationally drive the gas turbine 1 by the combustion gas c generated at the burning, the fuel gas supplier 8 includes the two mixers 15, 16, and is configured to produce the mixed gas a by mixing the three types of gases of the first gas I, the second gas II, and the third gas III in the mixers 15, 16 in ascending order of specific gravity or in descending order of specific gravity, and to supply the mixed gas a to the combustor 2 as the fuel gas. Accordingly, gases with similar specific gravities are mixed sequentially in both cases of mixing in ascending order of specific gravity and of mixing in descending order of specific gravity. This allows production of the mixed gas a in which three types of gases of the first gas I, the second gas II, and the third gas III are evenly mixed. When this evenly mixed gas a is used as the fuel gas for the combustor 2, occurrence of uneven combustion is prevented and stable combustion is made possible.

Note that, the present invention is not limited to a case of mixing three types of gases (for example, three types of gases position downstream of the hydrogen/oxygen sensor 31. The emergency discharge valve 32 normally allows the mixed gas a to flow toward the gas compressor 6 so that the mixed gas a is supplied to the combustor 2. On the other hand, in an emergency when the hydrogen concentration and the oxygen concentration in the mixed gas a are high, the emergency discharge valve 32 switches the flow direction and discharges the mixed gas a from the fuel supply line 9.

The diluent gas mixer 34 has a configuration in which a fan 36, a gas cooler 37, and a flow regulating valve 38 are disposed in a diluent gas supply line 35 in this order from upstream. The upstream side of the diluent gas supply line 35 is connected to the exhaust line 12 at a position downstream of the exhaust heat recovery boiler 7, and the downstream side of the diluent gas supply line 35 is connected to the fuel supply line 9 at a position downstream of the emergency discharge valve 32. Accordingly, when the fan 36 operates, part of the combustion gas (exhaust gas) c flowing through the exhaust line 12 is introduced into the diluent gas supply line 35, cooled by the gas cooler 37, has its flow regulated by the flow regulating valve 38, and mixed with the mixed gas a as a diluent gas. At this time, the hydrogen concentration and the oxygen concentration in the mixed gas a are diluted by the part of the fuel gas a (diluent gas), and are thereby reduced. Note that, although the connection part of the fuel supply line 9 and the diluent gas supply line 35 is a mixture part in the illustrated example, a mixer may be provide at the connection part to mix the mixed gas a and the combustion gas (exhaust gas) c. The hydrogen/oxygen sensor 39 is provided to the fuel supply line 9 at a position anywhere between a position immediately after the connection part (mixture part) which is located downstream of the emergency discharge valve 32 and at which the mixture gas a and the combustion gas (exhaust gas) c are mixed, and an entrance of the gas compressor 6. The hydrogen/oxygen sensor detects the hydrogen concentration and the oxygen concentration in the mixed gas a or the hydrogen concentration and the oxygen concentration in a mixed gas of the mixed gas a and the combustion gas (exhaust gas) c.

The controller 33 causes the diluent gas mixer 34 to operate when the hydrogen concentration and the oxygen concentration in the mixed gas a detected by the hydrogen/oxygen sensor 31 become equal to or more than a first set value (a value set lower than an explosion limit). In other words, the controller 33 actuates the fan 36 and opens the flow regulating valve 38 to start the flow control. As a result, the part of the combustion gas (exhaust gas) c is mixed with the mixed gas a as the diluent gas as describe above. In addition, the controller 33 causes the emergency discharge valve 32 to operate (switches the flow direction of the emergency discharge valve 32) to discharge the mixed gas a when the hydrogen concentration and the oxygen concentration in the mixed gas a detected by the hydrogen/oxygen sensor 31 become equal to or more than a second set value (a value set lower than the explosion limit) larger than the first set value. Alternatively, the controller 33 may cause the diluent gas mixer 34 to operate (actuate the fan 36 and open the flow regulating valve 38 to start the flow control) when the hydrogen concentration and the oxygen concentration in the mixed gas a detected by the hydrogen/oxygen sensor 39 become equal to or more than the first set value, and may cause the emergency discharge valve 32 to operate (switch the flow direction of the emergency discharge valve 32) to discharge the mixed gas a when the hydrogen concentration and the oxygen concentration in the mixed gas a detected by the hydrogen/oxygen sensor 39 become equal to or more than the second set value.

The other configurations of the gas turbine device of Embodiment 2 are same as those of the gas turbine device of Embodiment 1 (FIG. 1).

According to the gas turbine device of Embodiment 2, operational effects similar to those of the above-described Embodiment 1 can be obtained. In addition to that, the following effect is obtained. The fuel gas supplier 8 is configured to include the hydrogen/oxygen sensor 31 (or 39) that detects the hydrogen concentration and the oxygen concentration in the mixed gas a, the diluent gas mixer 34 that mixes, into the mixed gas a, the diluent gas for diluting the hydrogen concentration and the oxygen concentration, and the controller 33 that causes the diluent gas mixer 34 to operate to mix the diluent gas into the mixed gas a when the hydrogen concentration and the oxygen concentration detected by the hydrogen/oxygen sensor 31 (or 39) become equal to or more than the first set value. Accordingly, even when hydrogen and oxygen in the mixed gas a are released and hydrogen collection and oxygen collection are generated, it is possible to detect that the hydrogen concentration and the oxygen concentration in the mixed gas a are equal to or more than the first set value, and to dilute and reduce the hydrogen concentration and the oxygen concentration of the mixed gas a with the diluent gas before the mixed gas a with the high hydrogen concentration and oxygen concentration is supplied to the combustor 2. Thus, the hydrogen concentration and the oxygen concentration in the mixed gas a are suppressed to concentrations equal to or lower than the explosion limit, and the gas turbine device can be operated safely.

Moreover, according to the gas turbine device of Embodiment 2, the diluent gas mixer 8 is configured to mix, into the mixed gas a, the part of the combustion gas (exhaust gas) c exhausted from the gas turbine 1 as the diluent gas. Accordingly, the combustion gas is effectively used as the diluent gas, and there is no need for a nitrogen gas or the like. Thus, an efficient and inexpensive gas turbine device can be achieved.

Additionally, according to the gas turbine device of Embodiment 2, the fuel gas supplier 8 is configured to include the hydrogen/oxygen sensor 31 (or 39) that detects the hydrogen concentration and the oxygen concentration in the mixed gas a, the emergency discharge valve 32, and the controller 33 that causes the emergency discharge valve 32 to operate to discharge the mixed gas a when the hydrogen concentration and the oxygen concentration detected by the hydrogen/oxygen sensor 31 (or 39) become equal to or more than the second set value. Accordingly, even when hydrogen and oxygen in the mixed gas a are released and hydrogen collection and oxygen collection are generated thereby causing an increase in the hydrogen concentration and the oxygen concentration of the mixed gas a, it is possible to detect that the hydrogen concentration and the oxygen concentration in the mixed gas are equal to or more than the second set value, and to discharge the mixed gas a before the mixed gas a is supplied to the combustor 2. Thus, the risk of an explosion is reduced, and the gas turbine device can be operated safely.

Further, according to the gas turbine device of Embodiment 2, the fuel gas supplier 8 is configured to perform the mixing of the diluent gas by the diluent gas mixer 34 and the discharge of the mixed gas a by the emergency discharge valve 32 at positions downstream of the hydrogen/oxygen sensor 31. Accordingly, the mixed gas a with high hydrogen concentration and oxygen concentration which is detected by the hydrogen/oxygen sensor 31 on an upstream side can be surely mixed with the diluent gas by the diluent gas mixer 34 and discharged by the emergency discharge valve 32 on a downstream side.

Moreover, the gas turbine device of Embodiment 2 includes the gas compressor 6 that compresses the mixed gas a and supplies the mixed gas a thus compressed to the combustor 2, and the fuel gas supplier 8 is configured to perform the mixing of the diluent gas by the diluent gas mixer 34 and the discharge of the mixed gas a by the emergency discharge valve 32 at positions upstream of the gas compressor 6. Accordingly, the mixed gas a with high hydrogen concentration and oxygen concentration is mixed with the diluent gas by the diluent gas mixer 34 and discharged by the emergency discharge valve 32 before flowing into the gas compressor 6. Thus, the risk of an explosion can be surly reduced also in the gas turbine device with the gas compressor 6.

<Embodiment 3>

Figure 3:
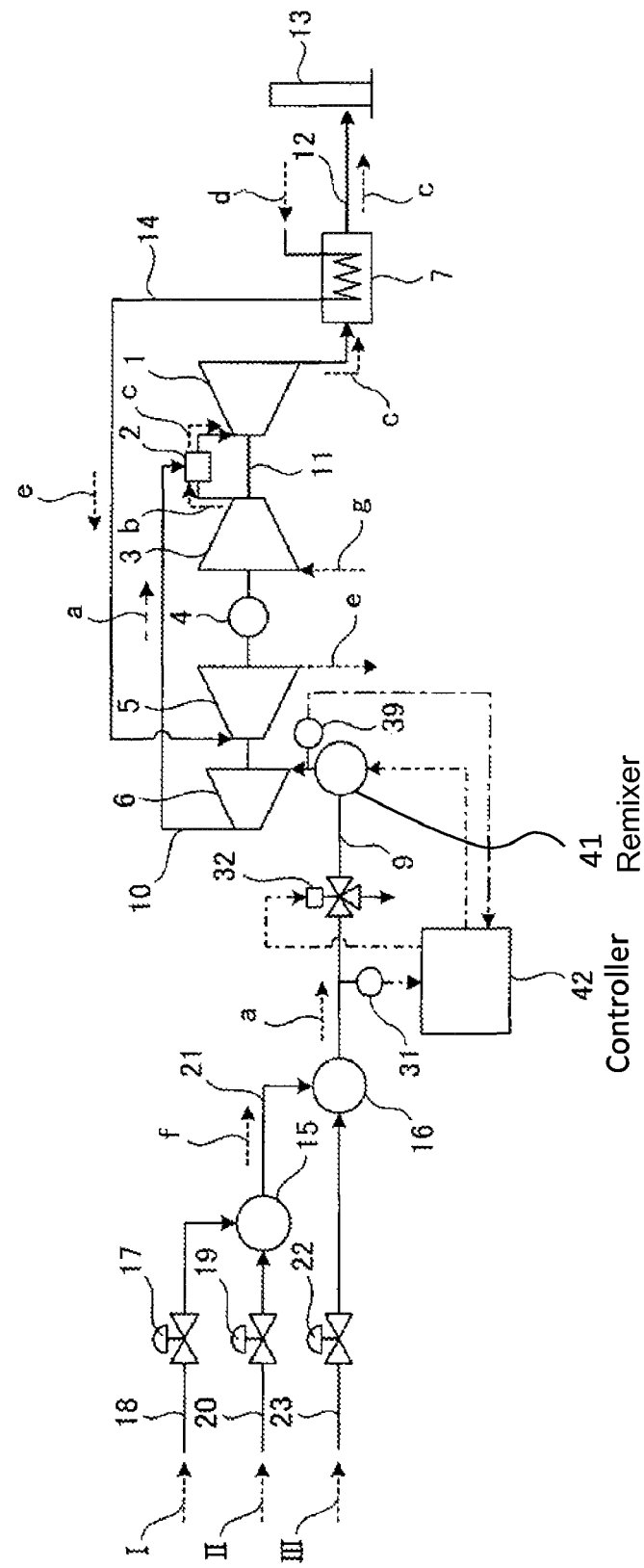
FIG. 3 is a configuration diagram of a gas turbine device according to Embodiment 3 of the present invention.
Figure 4:
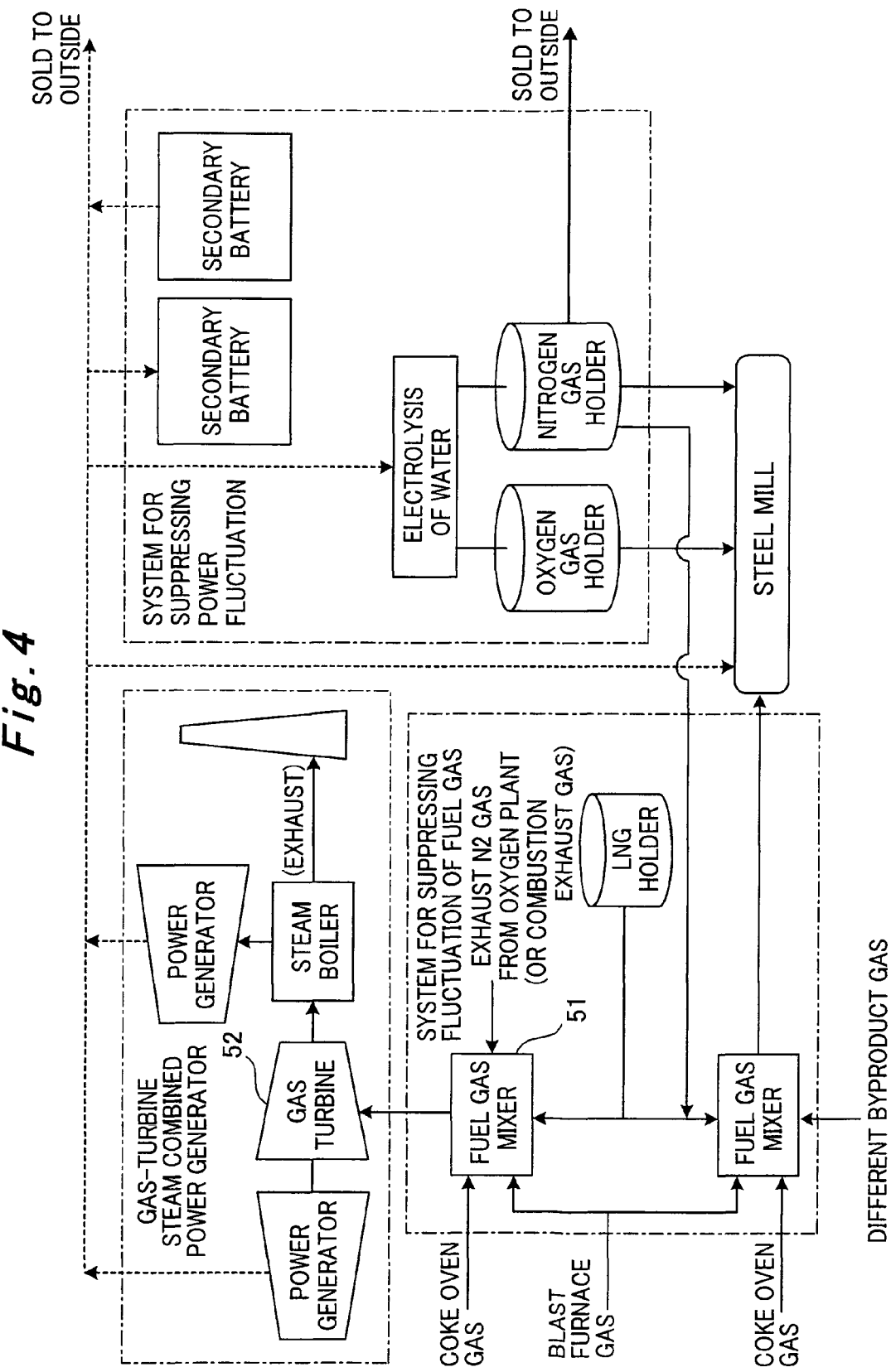
FIG. 4 is a configuration diagram of a conventional gas turbine device.

FIG. 3 is a configuration diagram of a gas turbine device according to Embodiment 3 of the present invention. Note that, in FIG. 3, components which are the same as those in FIG. 1 (Embodiment 1) and in FIG. 2 (Embodiment 2) are denoted with the same reference numerals as in FIG. 1 and FIG. 2, and overlapping detailed description thereof will be omitted.

As shown in FIG. 3, a fuel gas supplier 8 of Embodiment 3 includes the hydrogen/oxygen sensors 31, 39, the emergency discharge valve 32, a remixer 41, and a controller 42 in addition to the same configuration as that of the fuel gas supplier 8 of Embodiment 1 (FIG. 1).

The remixer 41 is disposed on the fuel supply line 9 at a position downstream of the hydrogen/oxygen sensor 31 and the emergency discharge valve 32. The remixer 41 performs remixing by agitating the mixed gas a produced in the second mixer 16. The hydrogen/oxygen sensor 39 is provided to the fuel supply line 9 at a position anywhere between a position immediately after the remixer 41 and an entrance of the gas compressor 6, and detects the hydrogen concentration and the oxygen concentration in the mixed gas a. The controller 42 causes the remixer 41 to operate to remix the mixed gas a when the hydrogen concentration and the oxygen concentration in the mixed gas a detected by the hydrogen/oxygen sensor 31 become equal to or more than a first set value (a value set lower than an explosion limit). In addition, the controller 42 causes the emergency discharge valve 32 to operate (switches the flow direction of the emergency discharge valve 32) to discharge the mixed gas a when the hydrogen concentration and the oxygen concentration in the mixed gas a detected by the hydrogen/oxygen sensor 31 become equal to or more than a second set value (a value set lower than the explosion limit) larger than the first set value. Alternatively, the controller 42 may cause the remixer 41 to operate to remix the mixed gas a when the hydrogen concentration and the oxygen concentration in the mixed gas a detected by the hydrogen/oxygen sensor 39 become equal to or more than the first set value, and may cause the emergency discharge valve 32 to operate (switch the flow direction of the emergency discharge valve 32) to discharge the mixed gas a when the hydrogen concentration and the oxygen concentration in the mixed gas a detected by the hydrogen/oxygen sensor 39 become equal to or more than the second set value.

The other configurations of the gas turbine device of Embodiment 3 are same as those of the gas turbine devices of Embodiment 1, 2 (FIGS. 1, 2).

According to the gas turbine device of Embodiment 3, operational effects similar to those of the above-described Embodiment 1 can be obtained, and operational effects of the emergency valve 32 similar to those of the above-described Embodiment 2 can be obtained. In addition to that, following effect is obtained. The fuel gas supplier 8 has a configuration including the hydrogen/oxygen sensor 31 (or 39) that detects the hydrogen concentration and the oxygen concentration in the mixed gas a, and the controller 42 that causes the remixer 41 to operate to remix the mixed gas a when the hydrogen concentration and the oxygen concentration detected by the hydrogen/oxygen sensor 31 (or 39) become equal to or more than a first set value. Accordingly, even when hydrogen and oxygen in the mixed gas a are released and hydrogen collection and oxygen collection are generated (gravity separation occurs), it is possible to detect that the hydrogen concentration and the oxygen concentration in the mixed gas a are equal to or more than the first set value before the mixed gas a with the high hydrogen concentration and oxygen concentration is supplied to the combustor 2, and to achieve an evenly mixed state again by performing remixing by agitating the mixed gas a with the remixer 2 before the mixed gas a is supplied to the combustor 2. Thus, the risk of an explosion is reduced, and the gas turbine device can be operated safely.

Note that, the remixer 41 is not limited to a case where the controller 42 causes the remixer 41 to operate based on a detection signal of the hydrogen/oxygen sensor 31 (or 39) as described above. Instead, the remixer 41 may always be caused to operate continuously or intermittently.

Further, according to the gas turbine device of Embodiment 3, the fuel gas supplier 8 is configured to perform the remixing of the mixed gas a by the remixer 41 at a position downstream of the hydrogen/oxygen sensor 31. Accordingly, the mixed gas a with high hydrogen concentration and oxygen concentration which is detected by the hydrogen/oxygen sensor 31 on an upstream side can be surely remixed by the remixer 41 on a downstream side.

Moreover, the gas turbine device of Embodiment 3 includes the gas compressor 6 that compresses the mixed gas a and supplies the mixed gas a thus compressed to the combustor 2, and the fuel gas supplier 8 is configured to perform the remixing of the mixed gas a by the remixer 41 at a position upstream of the gas compressor 6. Accordingly, the mixed gas a with high hydrogen concentration and oxygen concentration is remixed by the remixer 41 before flowing into the gas compressor 6. Thus, the risk of an explosion can be surly reduced also in the gas turbine device with the gas compressor 6.

Note that, the configuration of Embodiment 3 may be combined with the configuration of Embodiment 2.

Moreover, the present invention can be applied not only to a gas turbine device dedicated to low calorie gas combustion but also to a gas turbine device which uses a mixed gas obtained by mixing together three or more types of gases as a fuel gas for a combustor.

Industrial Applicability

The present invention relates to a gas turbine device which uses a mixed gas obtained by mixing together three or more types of gases (for example, three or more types of gases from any of single gases such as a butane gas and a propane gas and gases in which multiple types of gases are mixed such as the blast furnace gas and a converter gas) as a fuel gas for a combustor, and is effective, for example, when applied to a case where a mixed gas obtained by mixing together various excessive gases produced in a steel mill is used as a fuel gas for a combustor.

The invention claimed is:

1. A gas turbine device configured to burn in a combustor a fuel gas supplied from a fuel gas supplier, together with a compressed air supplied from an air compressor, and to rotationally drive a gas turbine by a combustion gas generated at the burning,
   wherein the fuel gas supplier includes a plurality of mixers, and is configured to produce a mixed gas by mixing three or more types of gases in the mixers in ascending order of specific gravity or in descending order of specific gravity, and to supply the mixed gas to the combustor via a fuel supply line as the fuel gas, and
   wherein the fuel gas supplier is configured to include:
      a hydrogen/oxygen sensor that detects a hydrogen concentration and an oxygen concentration in the mixed gas;
      a diluent gas mixer that mixes, into the mixed gas, a diluent gas for diluting the hydrogen concentration and the oxygen concentration; and
      a controller that causes the diluent gas mixer to operate to mix the diluent gas into the mixed gas when the hydrogen concentration and the oxygen concentration detected by the hydrogen/oxygen sensor become equal to or more than a set value;
      a remixer that performs remixing by agitating the mixed gas; and
      an emergency discharge valve provided in the fuel supply line, wherein
the controller causes the emergency discharge valve to operate to discharge the mixed gas when the hydrogen concentration and the oxygen concentration detected by the hydrogen/oxygen sensor become equal to or more than a set value,
the location where the mixed gas is discharged is the emergency discharge valve, and
the mixed gas is discharged from the emergency discharge valve when the emergency discharge valve is made to operate.

2. The gas turbine device according to claim 1, wherein the diluent gas mixer is configured to mix, into the mixed gas, part of the combustion gas exhausted from the gas turbine as the diluent gas.

3. The gas turbine device according to claim 1, wherein the fuel gas supplier is configured to perform the mixing of the diluent gas by the diluent gas mixer at a position downstream of the hydrogen/oxygen sensor.

4. The gas turbine device according to claim 1, further comprising a gas compressor that compresses the mixed gas and supplies the mixed gas thus compressed to the combustor, wherein the fuel gas supplier is configured to perform the mixing of the diluent gas by the diluent gas mixer at a position upstream of the gas compressor.

5. The gas turbine device according to claim 1, wherein the fuel gas supplier is configured to perform the discharge of the mixed gas by the emergency discharge valve at a position downstream of the hydrogen/oxygen sensor.

6. The gas turbine device according to claim 1, further comprising a gas compressor that compresses the mixed gas and supplies the mixed gas thus compressed to the combustor; wherein the fuel gas supplier is configured to perform the discharge of the mixed gas by the emergency discharge valve at a position upstream of the gas compressor.

7. The gas turbine device according to claim 1, wherein the fuel gas supplier is configured to include:
a controller configured to cause that causes the remixer to operate to remix the mixed gas when the hydrogen concentration and the oxygen concentration detected by the hydrogen/oxygen sensor become equal to or more than a set value.

8. The gas turbine device according to claim 7, wherein the fuel gas supplier is configured to perform the remixing of the mixed gas by the remixer at a position downstream of the hydrogen/oxygen sensor.

9. The gas turbine device according to claim 1 wherein at least two of the plurality of mixers of the fuel gas supplier are upstream from the remixer.

10. The gas turbine device according to claim 1 wherein the gas turbine device is a combined cycle power generating device including a steam turbine, a combustor, an electrical generator, a gas compressor, an exhaust heat recovery boiler, and wherein the gas turbine, the steam turbine, the air compressor, the electrical generator and the gas compressor are disposed on the same rotary shaft, wherein the air compressor, the electrical generator and the gas compressor are rotationally driven by the gas turbine and the steam turbine.

11. A gas turbine device configured to burn in a combustor a fuel gas supplied from a fuel gas supplier, together with a compressed air supplied from an air compressor, and to rotationally drive a gas turbine by a combustion gas generated at the burning,
wherein the fuel gas supplier includes a plurality of mixers, and is configured to produce a mixed gas by mixing three or more types of gases in the mixers in ascending order of specific gravity or in descending order of specific gravity, and to supply the mixed gas to the combustor as the fuel gas, and
wherein the fuel gas supplier is configured to include:
a hydrogen/oxygen sensor that detects a hydrogen concentration and an oxygen concentration in the mixed gas;
an emergency discharge valve provided in the fuel line; and
a controller that causes the emergency discharge valve to operate to discharge the mixed gas when the hydrogen concentration and the oxygen concentration detected by the hydrogen/oxygen sensor become equal to or more than a set value; and
a remixer that performs remixing by agitating the mixed gas.

12. The gas turbine device according to claim 11, wherein the fuel gas supplier is configured to perform the discharge of the mixed gas by the emergency discharge valve at a position downstream of the hydrogen/oxygen sensor.

13. The gas turbine device according to claim 11, further comprising a gas compressor that compresses the mixed gas and supplies the mixed gas thus compressed to the combustor; wherein the fuel gas supplier is configured to perform the discharge of the mixed gas by the emergency discharge valve at a position upstream of the gas compressor.

* * * * *